US012595966B1

(12) United States Patent
Navarro Morales et al.

(10) Patent No.: US 12,595,966 B1
(45) Date of Patent: Apr. 7, 2026

(54) RECYCLING CARBON IN BLAST FURNACE GAS EMISSIONS

(71) Applicant: Schlumberger Technology Corporation, Sugar Land, TX (US)

(72) Inventors: Omar Navarro Morales, Houston, TX (US); Z. Frank Zheng, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/017,822

(22) Filed: Jan. 13, 2025

(51) Int. Cl.
*C10L 3/08* (2006.01)
*C25B 1/04* (2021.01)
*F27D 17/20* (2025.01)

(52) U.S. Cl.
CPC ................ *F27D 17/20* (2025.01); *C10L 3/08* (2013.01); *C25B 1/04* (2013.01)

(58) Field of Classification Search
CPC .... F27D 17/20; C10L 3/08; C25B 1/04; C10J 2300/093; C10J 2300/0946; C10J 2300/0979; C10J 3/72; C10J 3/78; C10J 1/00; C10J 2300/1238; C10J 2300/1659; C10J 3/18; F27B 17/00; C10G 2/32
See application file for complete search history.

(56) References Cited

U.S. PATENT DOCUMENTS 3,817,724 A * 6/1974 Ellis et al. ............... C10J 3/845 48/209
4,631,915 A * 12/1986 Frewer ....................... C10J 3/86 518/703
7,786,327 B2 8/2010 Calderon
9,981,846 B1 5/2018 Kuku
10,208,665 B2 2/2019 Simpson
10,421,913 B2 9/2019 Von Olshausen
10,443,005 B2 * 10/2019 Wormser .................. C01B 3/38
11,214,488 B2 1/2022 Rueger
(Continued)

FOREIGN PATENT DOCUMENTS

CN 1192448 C * 3/2005 .......... H01M 8/0612
CN 101160375 B * 11/2012 ............... C10G 2/32
(Continued)

OTHER PUBLICATIONS

Bailera, M. et al., "A review on CO2 mitigation in the Iron and Steel industry through Power to X processes", Journal of CO2 Utilization, Apr. 1, 2021, vol. 46, pp. 1-30.
(Continued)

*Primary Examiner* — Kaity V Chandler
(74) *Attorney, Agent, or Firm* — Kyle R. Miiller

(57) ABSTRACT

A carbon recycling control system may generate electricity using blast furnace gas emissions from a blast furnace, the blast furnace gas emissions including carbon dioxide. A carbon recycling control system may concentrate the carbon dioxide from the blast furnace gas emissions using a post combustion carbon capture process, the post combustion carbon capture process resulting in a carbon dioxide rich stream. A carbon recycling control system may generate carbon monoxide at an electrolyzer using the carbon dioxide rich stream, the carbon monoxide combined with hydrogen gas to form a syngas. A carbon recycling control system may inject the syngas into the blast furnace.

20 Claims, 7 Drawing Sheets

(56) References Cited

U.S. PATENT DOCUMENTS

| | | | | |
|---|---|---|---|---|
| 11,512,402 | B2 * | 11/2022 | Bairamijamal | C07C 41/01 |
| 2009/0049748 | A1 * | 2/2009 | Day | C12N 1/12 48/77 |
| 2013/0000569 | A1 * | 1/2013 | Schneider | C10J 3/62 123/3 |
| 2013/0042615 | A1 * | 2/2013 | Calderon | C05C 11/00 423/239.1 |
| 2016/0319381 | A1 | 11/2016 | Achatz | |
| 2017/0130582 | A1 * | 5/2017 | Hsu | C10K 1/04 |
| 2020/0140770 | A1 * | 5/2020 | Tian | C10J 3/64 |
| 2020/0283920 | A1 * | 9/2020 | Bairamijamal | C10G 2/30 |

FOREIGN PATENT DOCUMENTS

| | | | | |
|---|---|---|---|---|
| CN | 218717035 | U | 3/2023 | |
| CN | 218779038 | U | 3/2023 | |
| DE | 102019005402 | A1 | 2/2021 | |
| KR | 101476563 | B1 * | 12/2014 | F23N 1/02 |
| KR | 20150099865 | A * | 9/2015 | F02C 9/40 |
| KR | 102421634 | B1 | 7/2022 | |
| KR | 20240138616 | A * | 9/2024 | C01B 32/40 |
| WO | 2017116307 | A1 | 7/2017 | |
| WO | 2022253938 | A1 | 12/2022 | |
| WO | 2024048423 | A1 | 3/2024 | |

OTHER PUBLICATIONS

Bailera, M., "Comparing different syngas for blast furnace ironmaking by using the extended operating line methodology", Fuel, Feb. 1, vol. 333, 2023, pp. 1-3.

Gao N. et al., "Intensified Co-electrolysis Process for Syngas Production from Captured CO2", Elsevier, Jan. 1, 2021, vol. 43, pp. 1-25.

Herz, G. et al., "" High Temperature Co-Electrolysis as a Key Technology for CO2 Emission Mitigation—A Model-Based Assessment of CDA and CCU. Chemie Ingenieur Technik, Jun. 22, 2020, vol. 92, pp. 1044-1058.

Elf, J. S., et al., "Carbon capture and utilisation in the steel industry" Bachelor of Science Thesis EGI-2017 , 2017, pp. 1-52.

Hu, Y. et al, "Opportunities to reduce energy consumption and $CO_2$ emissions from ironmaking blast furnace using $CO_2$ electrolysis to CO for carbon recycling", Journal of Cleaner Production, Feb. 20, 2023, vol. 389, 17 pages.

* cited by examiner

RECYCLING CARBON IN BLAST FURNACE GAS EMISSIONS

BACKGROUND OF THE DISCLOSURE

Flue gas from a blast furnace contains high amounts of carbon dioxide. Carbon dioxide derives from many sources, including combustible carbon sources (e.g., coal, natural gas) and carbon dioxide resulting from the smelting of iron ore to iron in a blast furnace. Carbon dioxide emissions from a blast furnace are typically high volume, which leads to difficulties in capture and storage systems.

SUMMARY

In some aspects, the techniques described herein relate to a method. A carbon recycling control system generates electricity using blast furnace gas emissions from a blast furnace, the blast furnace gas emissions including carbon dioxide. A carbon recycling control system concentrates the carbon dioxide from the blast furnace gas emissions using a post combustion carbon capture process. The post combustion carbon capture process results in a carbon dioxide rich stream. The carbon recycling control system generates carbon monoxide at an electrolyzer using the carbon dioxide rich stream. The carbon monoxide is combined with hydrogen gas to form a syngas. The carbon recycling control system injects the syngas into the blast furnace.

In some aspects, the techniques described herein relate to a carbon recycling system for a blast furnace. The carbon recycling system includes an electricity generation system positioned to receive blast furnace gas emissions from the blast furnace. The electricity generation system generates combustion exhaust. A carbon dioxide concentration system is positioned to receive the combustion exhaust and the blast furnace gas emissions. The carbon dioxide concentration system outputs a carbon dioxide rich stream. An electrolyzer is positioned to receive the carbon dioxide rich stream. The electrolyzer outputs carbon monoxide.

In some aspects, the techniques described herein relate to a method for carbon recycling. A carbon recycling control system combusts flue gas combustibles from blast furnace gas emissions to generate electricity, resulting in combustion exhaust. The carbon recycling control system separates nitrogen from the combustion exhaust, resulting in a carbon dioxide rich stream. The carbon recycling control system electrolyzes carbon dioxide in the carbon dioxide rich stream to generate carbon monoxide. The carbon recycling control system electrolyzes steam to generate hydrogen gas. The hydrogen gas and the carbon monoxide combine to form a syngas. The carbon recycling control system injects the syngas to a blast furnace.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
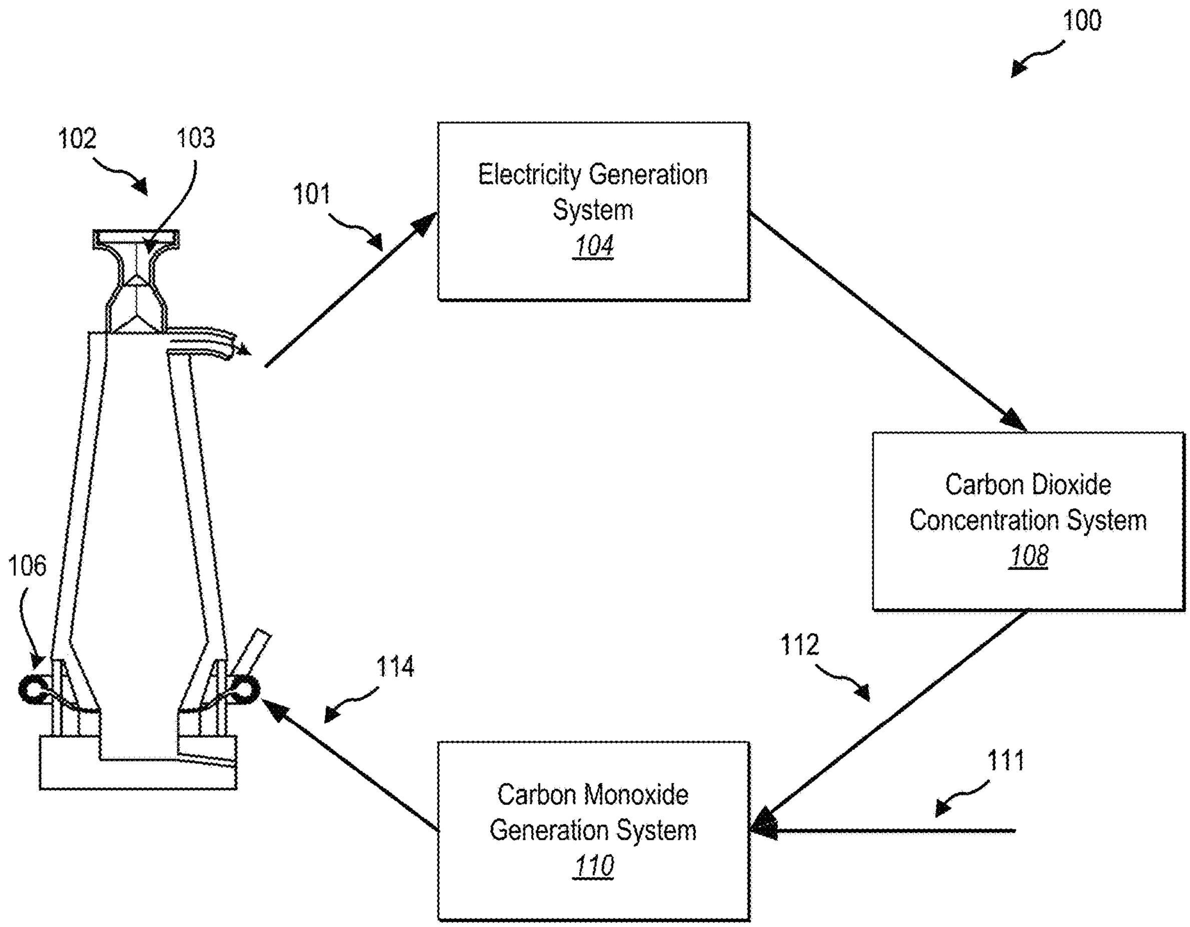
FIG. 1 is a representation of a carbon recycling system, according to at least one embodiment of the present disclosure.

This disclosure generally relates to devices, systems, and methods for carbon recycling from a blast furnace. Blast furnaces form (e.g., smelt) iron from iron ore. To form iron, the iron ore is heated in the presence of a reducing agent (e.g., carbon monoxide). The iron ore is typically in the form of an iron oxide. The iron oxide ore, in the presence of the heat from the blast furnace, reacts with carbon monoxide from the reducing agent to generate elemental iron (often called pig iron) and carbon dioxide. Heat is typically generated by combusting fossil fuels, such as coal, oil, or natural gas. Smelting in a blast furnace produces significant amounts of carbon dioxide, both from the reduction of iron oxide and the combustion of fossil fuels to generate heat.

In accordance with at least one embodiment of the present disclosure, a carbon recycling system may collect blast furnace gas emissions and recycle them to generate the reducing agent for the blast furnace. For example, the carbon recycling system may collect the blast furnace gas emissions and use the blast furnace gas emissions to generate electricity. In some embodiments, the carbon recycling system may generate electricity by combusting residual combustible gases in the blast furnace gas emissions. The blast furnace gas emissions may include various residual combustible gases, such as carbon monoxide, hydrogen, natural gas, and so forth. The electricity generation system may include a combustion system to combust the residual combustible gases to generate the electricity. Combustion of the residual combustible gases may result in additional carbon dioxide in the blast furnace gas emissions.

The blast furnace gas emissions, including the carbon dioxide from the combustion of the residual combustible gases, may be directed to a carbon dioxide concentration system. The carbon dioxide concentration system may include, for instance, a nitrogen separation system (so that the nitrogen is separated from the blast furnace gas emissions and the remaining concentration of carbon dioxide in the blast furnace gas emissions increases) and/or a carbon capture system. In some embodiments, the carbon dioxide concentration system may include a carbon dioxide separation system using an adsorbent or an absorbent material. The nitrogen separation system may separate the carbon dioxide and the nitrogen from the blast furnace gas emissions. This may result in a carbon dioxide rich stream and a carbon dioxide lean stream (e.g., the nitrogen stream). The carbon dioxide lean stream may include less than 5% of a carbon dioxide content of the combustion exhaust and the blast furnace gas emissions. The carbon capture system extracts from the blast furnace gas emissions the carbon dioxide, also resulting in a carbon dioxide rich stream (the stream including the captured carbon dioxide) and a carbon dioxide lean stream.

A co-electrolyzer may reduce the carbon dioxide in the carbon dioxide rich stream to form carbon monoxide as well as to oxidize water in order to form dioxygen and optionally dihydrogen. The carbon monoxide and the dihydrogen, if present, may be used to form a syngas. A syngas may be a combination of carbon monoxide and hydrogen gas.

In another embodiment, syngas may be produced by a combination of electrolysis (oxidizing water to form dihydrogen and dioxygen gas) in series with a reverse water gas shift (RWGS) process using the dihydrogen gas and carbon dioxide as inputs to produce carbon monoxide and water.

The syngas output from the RWGS process and/or co-electrolysis process may be injected to the blast furnace. For example, the syngas output from the RWGS process may be injected to the blast furnace such that the carbon monoxide in the syngas may act as a reducing agent in the smelting of iron ore to pig iron. Utilizing the syngas as the reducing agent in the blast furnace may reduce the overall carbon emissions from the blast furnace. For example, because the carbon dioxide in the blast furnace gas emissions is used to generate the syngas, the carbon recycling system may result in a closed loop, generating a carbon recycling loop.

The concentration of gases of the syngas to be recycled may vary depending on the temperature profile of the blast furnace column and the temperature surrounding the blast zone. For example, a high concentration of dihydrogen can absorb temperature and generate cold spots around the blast zone. The maximum concentration of dihydrogen may depend on the blast furnace dimensions, process conditions, materials used, and so forth. In some embodiments, hydrogen in the syngas may include up to 35% of the composition of the syngas.

In accordance with at least one embodiment of the present disclosure, carbon monoxide in the syngas may have a carbon monoxide concentration. In some embodiments, the carbon monoxide concentration may be in a range having an upper value, a lower value, or upper and lower values including any of 65%, 70%, 75%, 80%, 85%, 90%, 95% or any value therebetween. For example, the carbon monoxide concentration may be greater than 65%. In another example, the carbon monoxide concentration may be less than 90%. In yet other examples, the carbon monoxide concentration may be any value in a range between 65% and 90%. In some embodiments, it may be critical that the carbon monoxide concentration is between 65% and 75% to provide a sufficient reducing environment to form iron in the blast furnace.

In accordance with at least one embodiment of the present disclosure, hydrogen in the syngas may have a hydrogen concentration. In some embodiments, the hydrogen concentration may be in a range having an upper value, a lower value, or upper and lower values including any of 20%, 21%, 22%, 23%, 24%, 25%, 26%, 27%, 28%, 29%, 30%, 31%, 32%, 33%, 34%, 35%, or any value therebetween. For example, the hydrogen concentration may be greater than 20%. In another example, the hydrogen concentration may be less than 35%. In yet other examples, the hydrogen concentration may be any value in a range between 20% and 35%. In some embodiments, it may be critical that the hydrogen concentration is between 25% and 30% to provide a sufficient reducing environment to form iron in the blast furnace.

The other components of the syngas may include hydrogen, carbon dioxide, methane, and other gases. In some embodiments, the amount of methane may be in a 1:2.5 ratio with the content of hydrogen, and the amount of oxygen and/or air will have a 1:2 ratio with the methane in the syngas.

In some embodiments, the electricity generated by the combustion of the flue gas combustibles in the blast furnace gas emissions may be used to power one or more processes in the carbon recycling system. For example, the electricity may be used to power the syngas generation process and/or the electrolyzer and/or co-electrolyzer. In some examples, the electricity may be used to power the nitrogen separation and carbon dioxide concentration process. In some examples, the electricity may be used to power one or more ancillary systems, such as the pumps, valves, louvers, and so forth that may be used to direct the blast furnace gas emissions and carbon dioxide streams within the carbon recycling system.

FIG. 1 is a representation of a carbon recycling system 100, according to at least one embodiment of the present disclosure. The carbon recycling system 100 may direct blast furnace gas emissions 101 (e.g., flue gas) from a blast furnace 102 to an electricity generation system 104. Put another way, the electricity generation system 104 may be positioned to receive the blast furnace gas emissions 101 from the blast furnace 102. The blast furnace 102 may be any type of blast furnace. During operation, iron ore may be input into the blast furnace 102 at a top end 103 of the blast furnace 102. Heat may be generated at a bottom end 106 of the blast furnace 102, such as through the combustion of fossil fuels, electrically generated, or otherwise generated. The temperature in the blast furnace 102 may increase from the top end 103 to the bottom end 106 of the blast furnace 102. As the iron ore travels from the top end 103 to the bottom end 106, the iron ore may be reduced by a reducing agent, eventually forming pig iron and slag. The pig iron and slag may be recovered from the bottom end 106. Reduction of the iron ore may further generate carbon dioxide. The carbon dioxide generated through reduction of the iron ore may be mixed with other gases in the blast furnace 102 to form the blast furnace gas emissions 101.

Conventionally, the reducing agent may be formed from a material such as coke, a flux such as limestone, or other origin. The coke and/or limestone may be inserted into the blast furnace 102 at the top end 103 with the iron ore. The heat may cause the coke and/or limestone to release carbon monoxide, which may then facilitate reduction of the iron ore.

In accordance with at least one embodiment of the present disclosure, the carbon recycling system 100 may facilitate recycling of the carbon dioxide and/or carbon monoxide (collectively "carbon") used during iron ore processing. As discussed in further detail herein, the carbon may be recycled in various acts, such as through combustion in an electricity generation system 104, separation and concentration in a carbon dioxide concentration system 108, and conversion into a syngas using a carbon monoxide generation system 110 and/or an electrolysis system in series with a RWGS process. The syngas generated from the carbon dioxide may be injected into the blast furnace 102 as a reducing agent in the steel forming process.

The blast furnace gas emissions 101 may be captured from the blast furnace 102. For example, the exhaust of the blast furnace 102 may include one or more pipes, ducts, or conduits that may direct the blast furnace gas emissions 101 to various elements of the carbon recycling system 100. For example, the blast furnace gas emissions 101 may be directed to the electricity generation system 104. The electricity generation system 104 may generate electricity using the blast furnace gas emissions 101 in any manner. For example, the electricity generation system 104 may generate electricity using the residual heat of the blast furnace gas emissions 101. The blast furnace gas emissions 101 may be exhausted from the blast furnace 102 at a temperature of between 800° C. and 900° C. The blast furnace gas emissions 101 may be used to drive a turbine used to generate electricity (i.e., electricity generation system 104), and the heat of said emissions may be further used to generate steam, pre-heat water for steam generation, for instance via a heat pump or heat exchanger in communication with the blast furnace gas emissions 101, or otherwise recycled. In some embodiments, based on the needs of the carbon recycling system 200, electricity generated by the electricity generation system 204 may be transferred to the electric grid.

In some embodiments, the blast furnace gas emissions 101 may include various flue gas combustibles. For example, the blast furnace gas emissions 101 may include carbon monoxide, hydrogen, natural gas, any other flue gas combustibles, and combinations thereof. In some embodiments, the flue gas combustibles may include combustible gases that were not originally intended to combust during the ironmaking process. For example, the flue gas combustibles may include carbon monoxide that was used as a reducing agent in the ironmaking process. In some examples, the flue gas combustibles may include syngas (e.g., syngas injected into the blast furnace 102, as discussed herein), including hydrogen gas and carbon monoxide, that was not used during the ironmaking process. In some examples, the flue gas combustibles may include combustible material that may have been off-gassed or a result of incomplete combustion from the combustion of fossil fuels used to heat the blast furnace 102. In some situations, the blast furnace gas emissions 101 may include up to 25% carbon monoxide and other flue gas combustibles.

In accordance with at least one embodiment of the present disclosure, the system may combust the flue gas combustibles to generate electricity. For example, the electricity generation system 104 may combust the residual carbon monoxide and residual hydrogen gas in the blast furnace gas emissions 101 to generate heat, and the heat may be used to generate electricity (for instance via a turbine). Combustion of the flue gas combustibles may result in combustion exhaust including additional carbon dioxide gas. The additional carbon dioxide gas may be added to or mixed with the carbon dioxide in the blast furnace gas emissions 101, thereby increasing the concentration of carbon dioxide of the blast furnace gas emissions 101 and reducing the concentration of carbon monoxide of the blast furnace gas emissions 101.

When the flue gas combustibles have been combusted at the electricity generation system 104, the blast furnace gas emissions 101, including the combusted carbon dioxide from the residual combustible material, may be directed to a carbon dioxide concentration system 108. The carbon dioxide concentration system 108 may be positioned to receive the output emissions from the electricity generation system 104 and/or the blast furnace gas emissions 101. The carbon dioxide concentration system 108 may concentrate the carbon dioxide in the blast furnace gas emissions 101 and separate the nitrogen gas and other gases from the blast furnace gas emissions 101. This may result in a carbon dioxide rich stream 112 and a carbon dioxide lean stream. The carbon dioxide lean stream may be exhausted to the atmosphere and/or directed to another location for further storage, processing, or sale. The carbon dioxide lean stream may include less than 5% of a carbon dioxide content of the combustion exhaust from the electricity generation system 104 and the blast furnace gas emissions 101. In some embodiments, the carbon dioxide rich stream 112 may be pure carbon dioxide, or concentrated carbon dioxide. For example, the pure carbon dioxide of the carbon dioxide rich stream 112 may have a concentration of 100% carbon dioxide.

In some embodiments, the carbon recycling system 100 may identify how much carbon monoxide the blast furnace 102 may utilize while making the pig iron. The blast furnace 102 may direct a sufficient amount of the carbon dioxide rich stream 112 to the carbon monoxide generation system 110 to generate the carbon monoxide. The remaining carbon dioxide may be directed to a carbon dioxide storage and processing system. The carbon dioxide storage and processing system may collect the excess carbon dioxide for storage, sequestration, processing, use in industrial processes, sale, or other purposes.

The carbon dioxide concentration system 108 may be any type of carbon concentration system. For example, the carbon concentration process may include a post combustion carbon capture process. The post combustion carbon capture process may include any post combustion carbon capture process. In some embodiments, the post combustion carbon capture process may include an absorbent process, such as amine scrubbing. In some embodiments, the post combustion carbon capture process may include an adsorbent process, such as through a regenerative carbon sorbent, such as porous carbon or a metal organic framework. In some embodiments, the post combustion carbon capture process may include a membrane. In some embodiments, the post combustion carbon capture process may include an electrochemical process, such as electrochemically switched ion exchange. In some embodiments, the post combustion carbon capture process may include any other process that may releasably separate carbon dioxide from the blast furnace gas emissions 101. In other embodiments, the carbon concentration system may include a nitrogen separation unit that extracts nitrogen from the input stream, outputting a nitrogen rich stream and a nitrogen lean stream having an increased concentration of carbon dioxide.

The carbon dioxide rich stream may be passed or directed to the carbon monoxide generation system 110. The carbon monoxide generation system 110 may apply electricity to an electrochemical cell having a cathode and an anode that receives the carbon dioxide rich stream 112 and a water stream 111 (for instance steam) and reduces carbon dioxide to form carbon monoxide, and also forms dioxygen and optionally dihydrogen. The carbon dioxide rich stream 112 is generally fed to the cathode of the electrolyzer cell that outputs the carbon monoxide stream. In some embodiments, the water stream 111 is fed to the cathode that also outputs dihydrogen while the anode outputs dioxygen. In other embodiments, the water stream 111 is fed to the anode that outputs dioxygen. The carbon monoxide may combine with hydrogen gas (produced by the co-electrolyzer unit or by an external unit) to form a syngas 114. The syngas 114 may then be used as an input and injected into the blast furnace 102. For example, the syngas 114 may be injected into the blast furnace 102 as a reducing agent for the formation of pig iron from iron ore.

In accordance with at least one embodiment of the present disclosure, the carbon recycling system 100 may be a closed loop for carbon (including carbon dioxide and carbon monoxide). For example, an entirety of the blast furnace gas emissions 101 may be used to generate electricity. The entirety of the blast furnace gas emissions 101, including the carbon dioxide resulting from combustion of flue gas combustibles in the electricity generation system 104, may be processed by the carbon dioxide concentration system 108. The entirety of the carbon dioxide rich stream 112 may be co-electrolyzed at the carbon monoxide generation system 110. The entirety of the carbon dioxide rich stream 112 may be directed to the carbon monoxide generation system 110. An entirety of the syngas generated by the carbon monoxide generation system 110 may be injected into the blast furnace 102. In this manner, by recycling the entirety of the carbon (including the carbon dioxide and carbon monoxide) in the blast furnace 102, the carbon recycling system 100 may reduce the total carbon dioxide emissions of the blast furnace 102.

The carbon recycling system 100 may have a carbon recycling efficiency, which may be the total amount of carbon (including both carbon dioxide and carbon monoxide) recycled and/or stored with respect to the total amount of carbon dioxide produced by the blast furnace 102 (e.g., total amount of carbon dioxide recycled and/or stored divided by total amount emitted). In some embodiments, the carbon recycling efficiency may be in a range having an upper value, a lower value, or upper and lower values including any of 35%, 40%, 45%, 50%, 55%, 60%, 65%, or any value therebetween. For example, the carbon recycling efficiency may be greater than 35%. In another example, the carbon recycling efficiency may be less than 65%. In yet other examples, the carbon recycling efficiency may be any value in a range between 35% and 65%. In some embodiments, it may be critical that the carbon recycling efficiency is greater than 50% to reduce the carbon emissions from the carbon recycling system 100.

Figure 2:
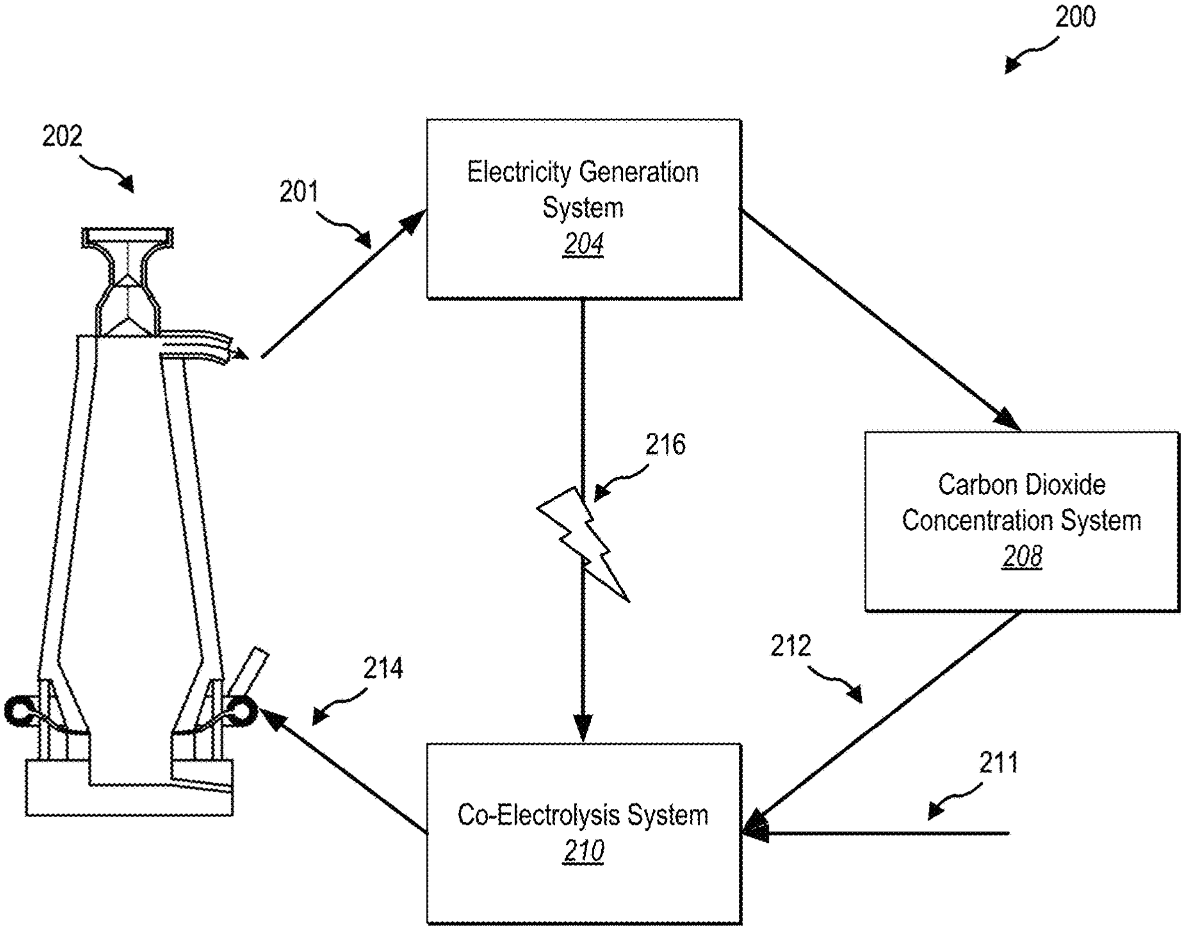
FIG. 2 is a representation of a carbon recycling system, according to at least one embodiment of the present disclosure.

FIG. 2 is a representation of a carbon recycling system 200, according to at least one embodiment of the present disclosure. The carbon recycling system 200 may facilitate recycling of the carbon used during iron ore processing. The carbon recycling system 200 may direct blast furnace gas emissions 201 (e.g., flue gas) from a blast furnace 202 to an electricity generation system 204. Put another way, the electricity generation system 204 may be positioned to receive the blast furnace gas emissions 201 from the blast furnace 202. As discussed in further detail herein, the carbon may be recycled in various acts, such as through combustion in an electricity generation system 204, separation and concentration in a carbon dioxide concentration system 208 positioned to receive the combustion exhaust from the electricity generation system 204. The carbon dioxide concentration system 208 outputs a carbon dioxide rich stream 212. The co-electrolysis system 210 may use the carbon dioxide rich stream 212 and a water stream 211 to generate carbon monoxide, and optionally dihydrogen, used in turn to generate a syngas 214.

As discussed herein, the electricity generation system 204 may generate electricity 216. The electricity 216 may be used to power any of the systems of the carbon recycling system 200. For example, the electricity 216 may be used to at least partially power the co-electrolysis system 210. In some examples, the electricity 216 may be used to at least partially power the carbon dioxide concentration system 208. In some embodiments, the electricity 216 may provide more than 50% of the electricity used to power the co-electrolysis system 210. In some embodiments, based on the needs of the carbon recycling system 200, electricity generated by the electricity generation system 204 may be transferred to the electric grid.

In accordance with at least one embodiment of the present disclosure, the electricity generation system 204 may provide the electricity 216 to the carbon dioxide concentration system 208. For example, the electricity 216 may be used to power the collection and/or release of carbon dioxide in the carbon dioxide concentration system 208. In some embodiments, the electricity 216 may provide more than 50% of the electricity used to power the carbon dioxide concentration system 208. In such systems, electricity 216 may for instance be used for fluid circulation (i.e., powering pumps, valves, etc.) or heating purposes (in the case the chemical reactions performed in the carbon concentration systems require heat).

In accordance with at least one embodiment of the present disclosure, and as discussed herein, the electricity generation system 204 may generate electricity in any manner. For example, the electricity generation system 204 may generate electricity by combusting residual combustible material from the blast furnace gas emissions 201. Such residual combustible material may include carbon monoxide, hydrogen, natural gas, products of incomplete combustion of fossil fuels, and so forth. The residual combustible material may be combusted in a furnace or other electricity generation system, and the resulting heat may be used to heat steam that may spin a turbine to generate electricity. In some embodiments, the expanded gases may be directed to a turbine to generate electricity.

In some embodiments, the system 200, for instance the electricity generation system 204, may otherwise capture energy from the blast furnace gas emissions 201. For example, the electricity generation system 204 may capture and recycle residual heat from the blast furnace gas emissions 201. The residual heat may be transferred to another system, such as through a heat exchanger in communication with the blast furnace gas emissions 201, which may in turn be used to generate electricity, or the output of the electricity generation system, to provide heat to various systems, and so forth. In some embodiments, the residual heat may be used to generate steam, such as steam used in the carbon dioxide concentration system 208 (e.g., during amine and/or sorbent regeneration), steam used in the co-electrolysis system 210 (e.g., during co-electrolysis for instance if such co-electrolyzer is of the solid oxide type that operates at high temperature), steam used to generate electricity (via a turbine), or other use.

Figure 3:
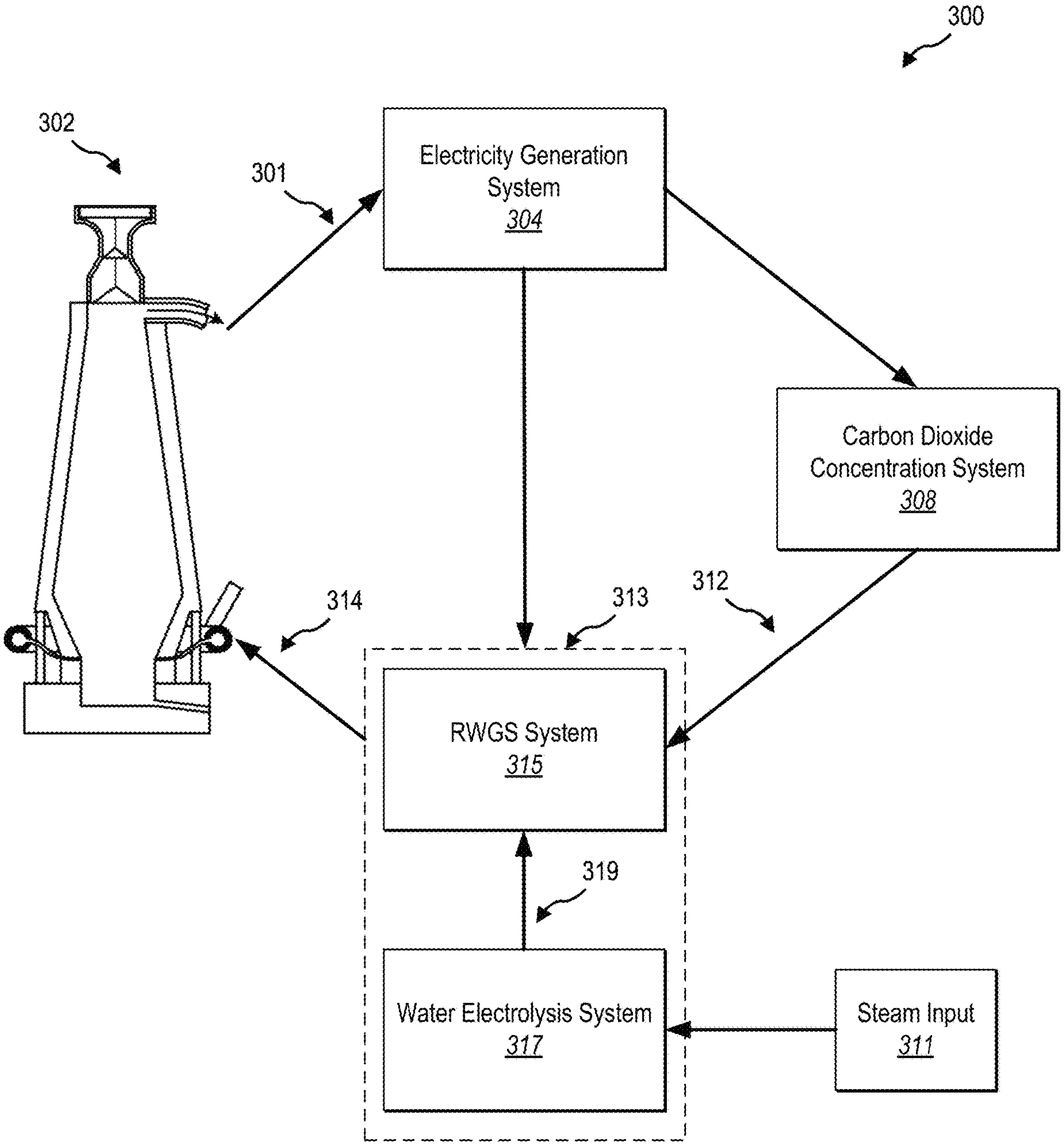
FIG. 3 is a representation of a carbon recycling system, according to at least one embodiment of the present disclosure.

FIG. 3 is a representation of a carbon recycling system 300, according to at least one embodiment of the present disclosure. The carbon recycling system 300 may facilitate recycling of the carbon used during iron ore processing. The carbon recycling system 300 may direct blast furnace gas emissions 301 (e.g., flue gas) from a blast furnace 302 to an electricity generation system 304. Put another way, the electricity generation system 304 may be positioned to receive the blast furnace gas emissions 301 from the blast furnace 302. As discussed in further detail herein, the carbon may be recycled in various acts, such as through combustion in an electricity generation system 304, separation and concentration in a carbon dioxide concentration system 308 positioned to receive the combustion exhaust from the electricity generation system 304. The carbon dioxide concentration system 308 outputs a carbon dioxide rich stream 312.

In accordance with at least one embodiment of the present disclosure, a syngas generation system 313 may generate a syngas 314 that may be used as a reducing agent in the blast furnace 302. In the embodiment shown, the syngas generation system 313 may include a RWGS system 315 and a water electrolysis system 317. The water electrolysis system 317 may electrolyze water to output dihydrogen 319 (e.g., hydrogen gas) and oxygen. The RWGS system 315 may generate carbon monoxide using the dihydrogen 319 outputted by the water electrolysis system 317 and the carbon dioxide rich stream 312 from the carbon dioxide concentration system 308. The syngas generation system 313 may generate the syngas 314 using the dihydrogen 319 (or dihydrogen from another source) and the carbon monoxide generated by the RWGS system 315.

As discussed herein, the electricity generation system 304 may be used to generate electricity to power one or more portions of the syngas generation system 313. For example, the electricity generated by the electricity generation system 304 may be used to power at least a portion of the RWGS system 315. In some examples, the electricity generated by the electricity generation system 304 may be used to power at least a portion of the water electrolysis system 317. In some examples, the electricity generated by the electricity generation system 304 may be used to power at least a portion of the carbon dioxide concentration system 308. In some examples, the electricity generated by the electricity generation system 304 may be used to generate the steam input 311. In some embodiments, residual heat from the blast furnace gas emissions 301 may be used to generate steam from a water stream for the steam input 311 and/or pre-heat the water stream for the steam input 311. In some embodiments, electricity generated by the electricity generation system 304 may be transferred to a grid, based on the power needs of the carbon recycling system 300.

In some embodiments, heat from the blast furnace gas emissions 301 may be collected and stored. For example, heat from the blast furnace gas emissions 301 may be collected and stored in a heat sink, such as mass of material, including a massive block of solid material, including a metallic block, a ceramic block, or other block of material. In some examples, the heat sink may include a liquid. The stored heat may then be used in any process of the carbon recycling system 300 when certain predefined criteria are met, for instance when the price of the electricity is above a certain threshold. For example, the stored heat may be used to generate the steam input 311, may be used in the RWGS system 315, may be used to regenerate a carbon capture material of the carbon dioxide concentration system 308, or otherwise used in the carbon recycling system 300.

Figure 4:
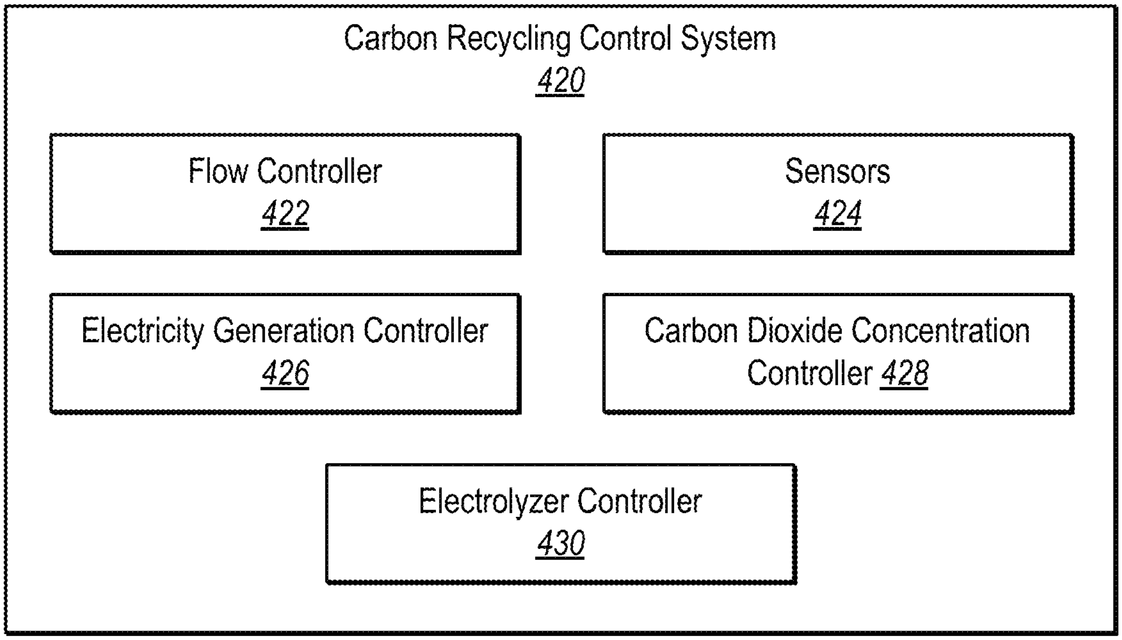
FIG. 4 is a schematic representation of a carbon recycling control system, according to at least one embodiment of the present disclosure.

FIG. 4 is a schematic representation of a carbon recycling control system 420, according to at least one embodiment of the present disclosure. Each of the components of the carbon recycling control system 420 can include software, hardware, or both. For example, the components can include one or more instructions stored on a computer-readable storage medium and executable by processors of one or more computing devices, such as a client device or server device. When executed by the one or more processors, the computer-executable instructions of the carbon recycling control system 420 can cause the computing device(s) to perform the methods described herein. Alternatively, the components can include hardware, such as a special-purpose processing device to perform a certain function or group of functions. Alternatively, the components of the carbon recycling control system 420 can include a combination of computer-executable instructions and hardware.

Furthermore, the components of the carbon recycling control system 420 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The carbon recycling control system 420 may include a flow controller 422. The flow controller 422 may control flow of gas through a carbon recycling system (such as the carbon recycling system 100 of FIG. 1, the carbon recycling system 200 of FIG. 2, and/or the carbon recycling system 300 of FIG. 3). For example, the flow controller 422 may direct flow of the blast furnace gas emissions, and derivative products, and other gasses through the carbon recycling system.

The flow controller 422 controls the operation of various components and movable elements of the carbon recycling system. For example, the flow controller 422 may control the operation of one or more valves, louvers, flow directors, fans, blowers, compressors, expansion valves, any other gas flow control element, and combinations thereof.

The carbon recycling control system 420 may further include one or more sensors 424. The sensors 424 may sense conditions of the carbon recycling system. For example, the sensors 424 may sense composition of the blast furnace gas emissions and other gases throughout the carbon recycling system. In some examples, the sensors 424 may measure the temperature of the various gases of the carbon recycling system. In some examples, the sensors 424 may measure the volumetric flow rate and/or the mass flow rate of the gases of the carbon recycling system. In some examples, the sensors 424 may measure the output of the various components of the carbon recycling system, such as the electricity generation system, the carbon dioxide concentration system, and the electrolysis system.

The carbon recycling control system 420 may utilize the measured parameters from the sensors 424 to control the various aspects of the carbon recycling system. For example, an electricity generation controller 426 may adjust the properties of the electricity generation system based on the properties of the blast furnace gas emissions. In some examples, the flow controller 422 may adjust the flow of the blast furnace gas emissions into the electricity generation system based on the properties of the blast furnace gas emissions.

In some examples, a carbon dioxide concentration controller 428 may control operation of the carbon dioxide concentration system. For example, the carbon dioxide concentration controller 428 may control the charging and/or discharging of carbon dioxide from the gas streams passing through the carbon dioxide concentration system based on the composition of the blast furnace gas emissions and/or the internal properties of the carbon dioxide concentration system. In some embodiments, the carbon dioxide concentration controller 428 may control the amount of carbon dioxide directed to the co-electrolysis or reverse water gas shift system and the amount of carbon dioxide directed to further processing and storage based on the throughput or other operating parameters of the blast furnace.

The carbon recycling control system 420 may further include a syngas generation controller 430. The syngas generation controller 430 may control generation of the syngas. For example, the syngas generation controller may control operation of the co-electrolysis system. In some embodiments, the syngas generation controller may control operation of the water electrolysis system and the RWGS system. In some embodiments, the syngas generation controller 430 may control generation of the syngas based on the composition of the syngas generated by the co-electrolysis system (or the combination water electrolysis system and the RWGS system), the amount of carbon dioxide received from the carbon dioxide concentration system, the throughput of the blast furnace, and so forth.

Figure 5:
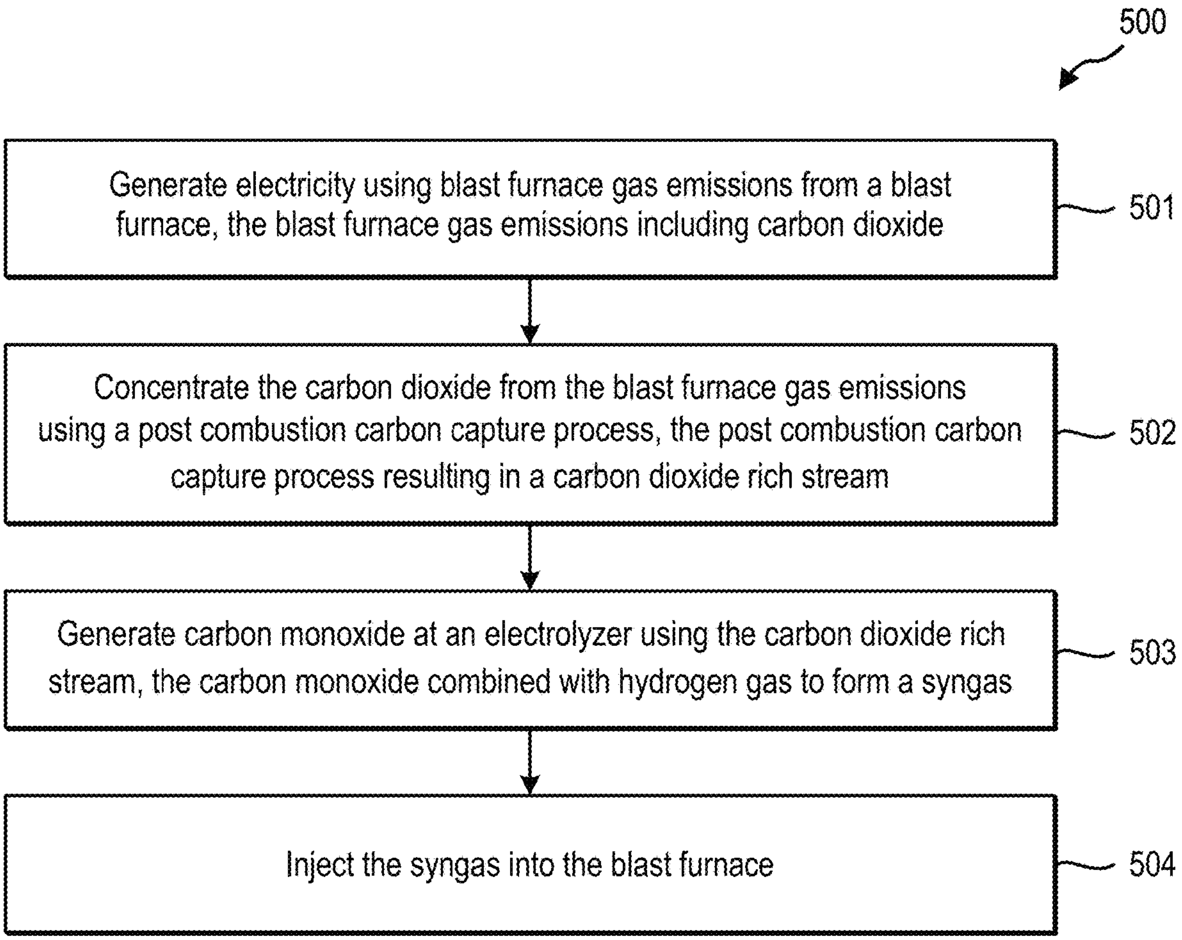
FIG. 5 is a flowchart of a method for recycling carbon, according to at least one embodiment of the present disclosure.
Figure 6:
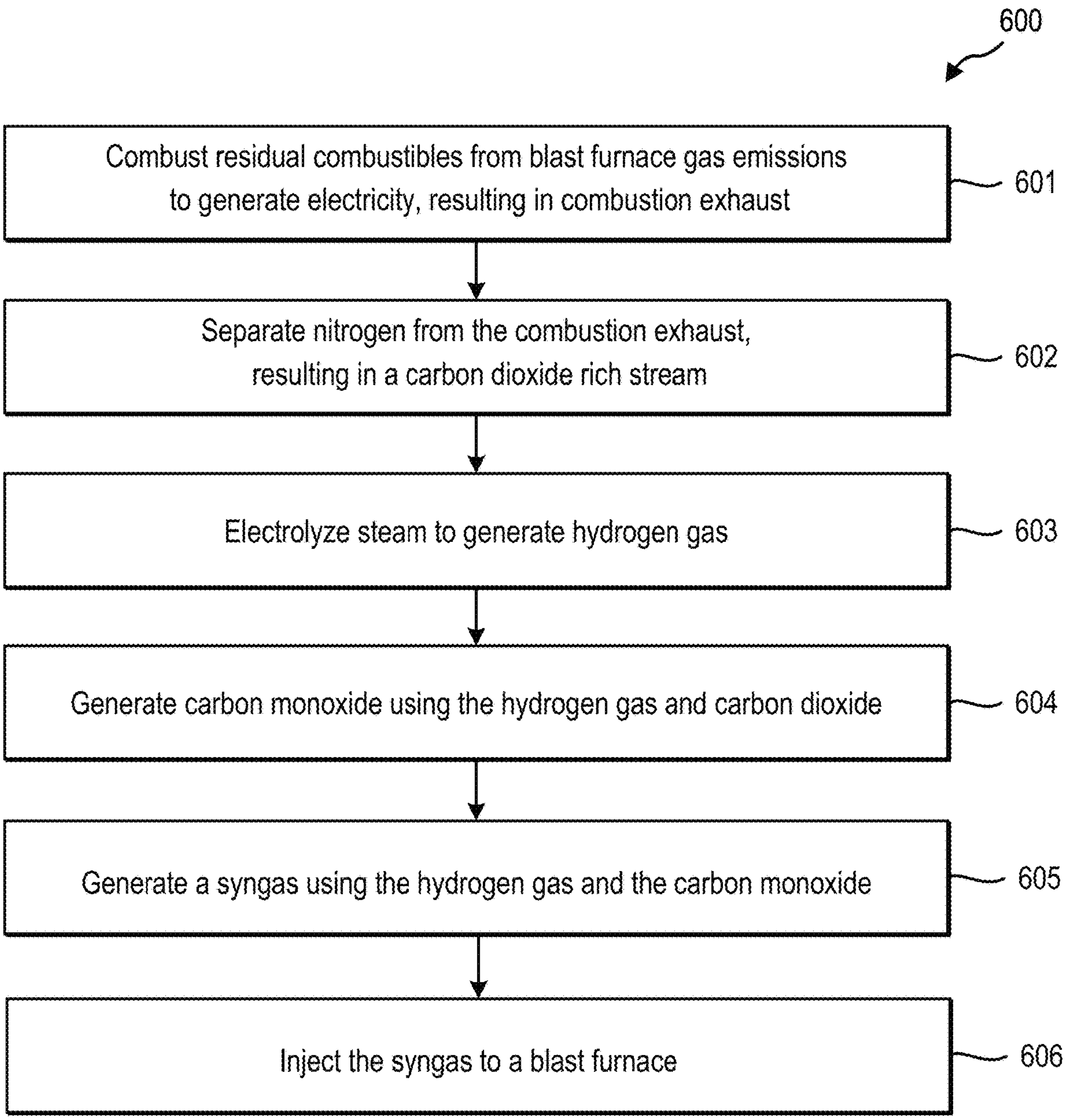
FIG. 6 is a flowchart of a method for recycling carbon, according to at least one embodiment of the present disclosure.

FIG. 5 and FIG. 6, the corresponding text, and the examples provide a number of different methods, systems, devices, and computer-readable media of the carbon recycling system and/or the carbon recycling control system. In addition to the foregoing, one or more embodiments can also be described in terms of flowcharts comprising acts for accomplishing a particular result, as shown in FIG. 5 and FIG. 6. FIG. 5 and FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 5 illustrates a flowchart of a series of acts or a method 500 for recycling carbon in a blast furnace, according to at least one embodiment of the present disclosure. While FIG. 5 illustrates acts according to one embodiment, alternative embodiments may omit, add to, reorder, and/or modify any of the acts shown in FIG. 5. The acts of FIG. 5 can be performed as part of a method. Alternatively, a computer-readable medium can comprise instructions that, when executed by one or more processors, cause a computing device to perform the acts of FIG. 5. In some embodiments, a system can perform the acts of FIG. 5.

A carbon recycling control system may generate electricity using blast furnace gas emissions from a blast furnace at 501. The blast furnace gas emissions may include various gases, such as carbon dioxide (at concentrations between 16% and 20%), carbon monoxide (at concentrations between 15% and 18%), hydrogen (at concentrations between 1% and 2%), nitrogen (at concentrations between 50% and 55%), and other trace gases. The carbon recycling control system may concentrate the carbon dioxide from the blast furnace gas emissions using a post combustion carbon capture process at 502. The post combustion carbon capture process may result in a carbon dioxide rich stream and a carbon dioxide lean stream. The carbon recycling control system may generate carbon monoxide (and optionally dihydrogen) at a co-electrolyzer using the carbon dioxide rich stream at 503 and a water (including liquid water or steam) stream as inputs. The carbon monoxide may be combined with dihydrogen gas (obtained from the co-electrolyzer or another source) to form a syngas. As discussed in further detail herein, the carbon recycling control system may generate the syngas using water electrolysis system in series with a RWGS system. The carbon recycling control system may inject the syngas into the blast furnace at 504. The syngas may be used as a reducing agent during the steelmaking process.

As discussed in further detail herein, in some embodiments, the carbon recycling control system may include one or more sensors that sense a condition of the carbon recycling system. For example, the sensors may sense a composition of the blast furnace gas emissions, a temperature of various gas streams in the carbon recycling system, volumetric flow rate of various gas streams in the carbon recycling system, mass flow rate of various gas streams in the carbon recycling system, the composition of the syngas, the output of the electricity generation system, and so forth. The carbon recycling control system may utilize the sensed conditions to adjust operation of the carbon recycling system, as discussed in further detail herein. In some embodiments, the carbon recycling control system may store heat from the blast furnace in a heat sink. The stored heat may be used on demand in the carbon recycling system, such as to generate steam and/or in the RWGS system (if applicable).

As mentioned, FIG. 6 illustrates a flowchart of a series of acts or a method 600 for recycling carbon in a blast furnace, according to at least one embodiment of the present disclosure. While FIG. 6 illustrates acts according to one embodiment, alternative embodiments may omit, add to, reorder, and/or modify any of the acts shown in FIG. 6. The acts of FIG. 6 can be performed as part of a method. Alternatively, a computer-readable medium can comprise instructions that, when executed by one or more processors, cause a computing device to perform the acts of FIG. 6. In some embodiments, a system can perform the acts of FIG. 6.

A carbon recycling control system may combust flue gas combustibles from blast furnace gas emissions to generate electricity, resulting in combustion exhaust at 601. The carbon recycling control system may separate nitrogen from the combustion exhaust, resulting in a carbon dioxide rich stream at 602. The carbon recycling control system may generate a syngas. For example, the carbon recycling control system may electrolyze water to generate dihydrogen gas at 603. The carbon recycling control system may utilize a RWGS reaction to generate carbon monoxide using carbon dioxide and the dihydrogen gas at 604. The hydrogen gas and the carbon monoxide may be combined to form a syngas at 605. The carbon recycling control system may inject the syngas to a blast furnace at 606.

As discussed in further detail herein, in some embodiments, the carbon recycling control system may include one or more sensors that sense a condition of the carbon recycling system. For example, the sensors may sense a composition of the blast furnace gas emissions, a temperature of various gas streams in the carbon recycling system, volumetric flow rate of various gas streams in the carbon recycling system, mass flow rate of various gas streams in the carbon recycling system, the composition of the syngas, the output of the electricity generation system, and so forth. The carbon recycling control system may utilize the sensed conditions to adjust operation of the carbon recycling system, as discussed in further detail herein. In some embodiments, the carbon recycling control system may store heat from the blast furnace in a heat sink. The stored heat may be used on demand in the carbon recycling system, such as to generate steam and/or in the RWGS system (if applicable).

Figure 7:
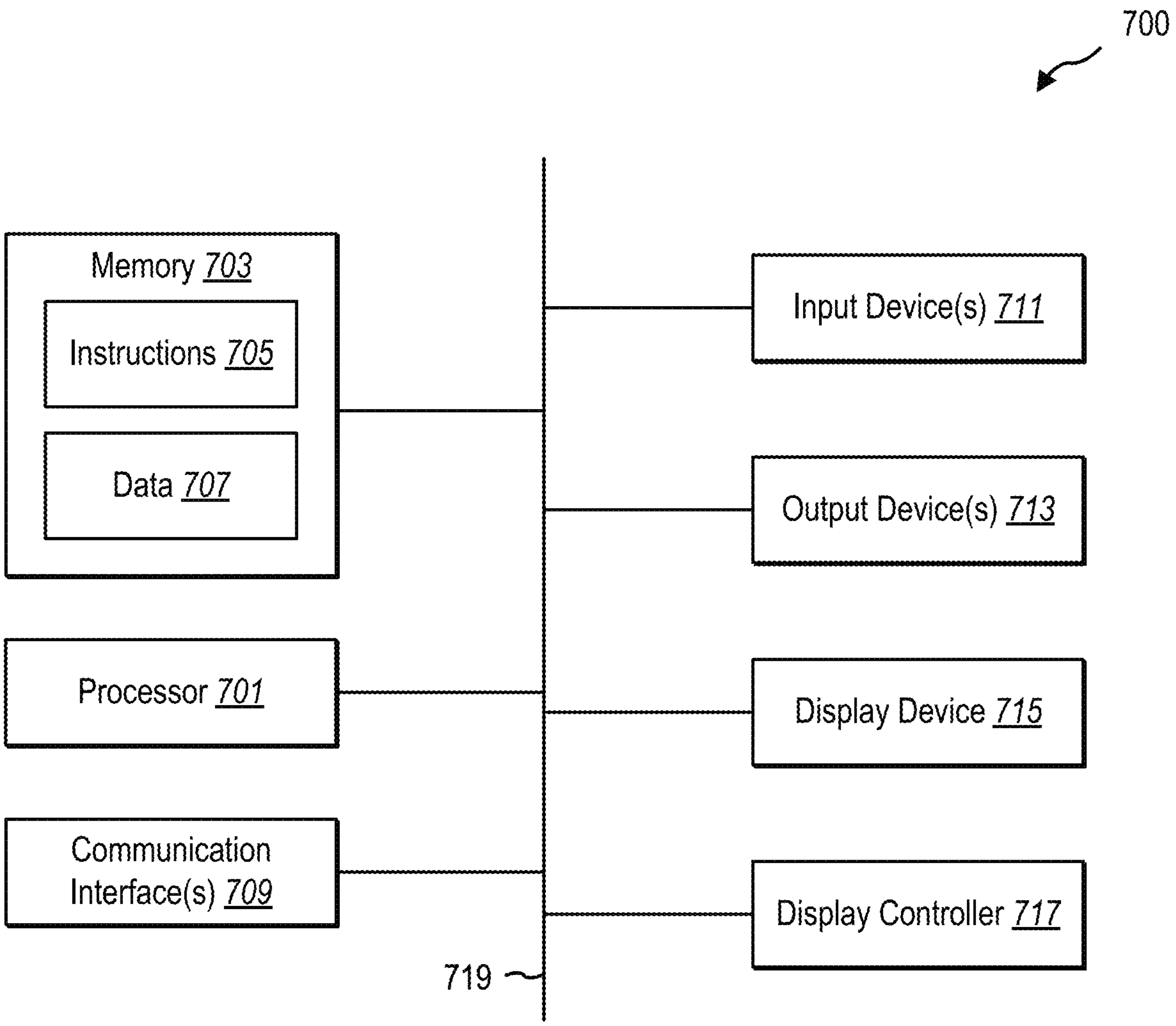
FIG. 7 is a representation of a computing system, according to at least one embodiment of the present disclosure.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

INDUSTRIAL APPLICABILITY

Following are sections of the present disclosure:

A1. A method, comprising:

generating electricity using blast furnace gas emissions from a blast furnace, the blast furnace gas emissions including carbon dioxide;

concentrating the carbon dioxide from the blast furnace gas emissions, the carbon dioxide concentration resulting in a carbon dioxide rich stream;

generating carbon monoxide using the carbon dioxide rich stream, and combining the carbon monoxide with hydrogen gas to form a syngas; and injecting the syngas into the blast furnace.

A2. The method of section A1, wherein generating the electricity includes generating the electricity before concentrating the carbon dioxide.

A3. The method of any preceding section, wherein generating carbon monoxide uses a co-electrolysis process using the carbon dioxide rich stream and a water stream to form the carbon monoxide and dioxygen gas.

A4. The method of the preceding section, wherein the co-electrolysis process further forms the hydrogen gas.

A5. The method of section A3 or A4, wherein the water stream is a steam stream.

A6. The method of section A1 or A2, wherein generating carbon monoxide uses a reverse water gas shift process using the carbon dioxide rich stream and a dihydrogen stream to form the carbon monoxide and water.

A7. The method of any preceding section, further comprising generating the dihydrogen stream using an electrolysis process, forming the dihydrogen stream and a dioxygen stream from a water stream.

A8. The method of any preceding section, wherein the water stream is a steam stream.

A9. The method of any preceding section, wherein generating the carbon monoxide includes generating the carbon monoxide using the electricity generated by the blast furnace gas emissions.

A10. The method of any preceding section, wherein concentrating the carbon dioxide includes concentrating the carbon dioxide using the electricity generated by the blast furnace gas emissions.

A11. The method of any preceding section, wherein generating the electricity includes generating the electricity by combusting flue gas combustibles in the blast furnace gas emissions.

A12. The method of the preceding section, further comprising combining the blast furnace gas emissions with a combustion exhaust from generating the electricity.

A13. The method of section A11 or A12, further including capturing residual heat in the blast furnace gas emissions.

A14. The method of the preceding section, further including re-using the captured residual heat in the carbon concentration, or carbon monoxide generation or for electricity generation.

A15. The method of the preceding section, further comprising, using residual heat from the blast furnace gas emissions to heat water for steam generation for injection into the electrolyzer.

A16. The method of any of sections A13 to A15, further including storing the captured heat in a thermal storage.

A17. The method of any preceding section, wherein the carbon concentration includes a post combustion carbon capture process that includes at least one of an amine, a sorbent, or a membrane.

A18. The method of any preceding section, wherein the carbon dioxide rich stream is pure carbon dioxide.

A19. The method of any preceding section, wherein the carbon concentration includes separating nitrogen from the blast furnace gas emissions, resulting in a nitrogen rich stream and the carbon rich stream.

A20. The method of any preceding section, further sensing at least one condition of one or more of the blast furnace gas emissions, the electricity, the carbon monoxide, or the syngas.

A21. The method of the preceding section, further comprising adjusting at least one operating parameter based on the at least one condition.

A22. The method of the preceding section, further comprising adjusting generating the electricity based on a composition of the blast furnace gas emissions.

B1. A carbon recycling system for a blast furnace, the carbon recycling system comprising:

an electricity generation system positioned to receive blast furnace gas emissions from the blast furnace, the electricity generation system generating combustion exhaust and producing electricity;

a carbon dioxide concentration system positioned to receive the combustion exhaust and/or the blast furnace gas emissions, and outputting a carbon dioxide rich stream; and a carbon monoxide generation system positioned to receive the carbon dioxide rich stream, and outputting carbon monoxide.

B2 The carbon recycling system of the preceding section, wherein the electricity generation system is electrically connected to the carbon monoxide generation system to power said carbon monoxide generation system.

B3. The carbon recycling system of any preceding section, wherein the electricity generation system combusts carbon monoxide in the blast furnace gas emissions to generate the combustion exhaust.

B4 The carbon recycling system of any preceding section, wherein the electricity generation system receives an entirety of the blast furnace gas emissions.

B5 The carbon recycling system of any preceding section, wherein the electricity generation system directs an entirety of the combustion exhaust to the carbon dioxide concentration system.

B6. The carbon recycling system of any preceding section, wherein the carbon dioxide concentration system outputs a carbon dioxide lean stream, the carbon dioxide lean stream including less than 5% of a carbon dioxide content of the combustion exhaust and the blast furnace gas emissions.

B7. The carbon recycling system of any preceding section, wherein the carbon monoxide generation system includes a co-electrolyzer that receives a water input and the carbon dioxide rich stream to output carbon monoxide, used to form a syngas.

B8. The carbon recycling system of the preceding section, wherein the co-electrolyzer further forms dihydrogen gas, used to form the syngas.

B9 The carbon recycling system of section B7 or B8, wherein the water input includes a steam input.

B10. The carbon recycling system of any of sections B1 through B6, wherein the carbon monoxide generation system includes generating a carbon monoxide using a reverse water gas shift (RWGS) system, the RWGS system receiving a dihydrogen gas input and the carbon dioxide rich stream.

B11. The carbon recycling system of the preceding section, further comprising a water electrolysis system, the water electrolysis system generating the dihydrogen gas and a dioxygen gas input using a water input.

B12. The carbon recycling system of any preceding section, further comprising a heat exchanger in communication with the blast furnace gas emissions and a water stream.

B13. The carbon recycling system of the preceding section, wherein the heat exchanger includes a thermal storage, the thermal storage storing heat from the blast furnace gas emissions.

B14. The carbon recycling system of section B12 or B13, wherein the water stream is in communication with the steam input.

B15. The carbon recycling system of any preceding section, further comprising at least one sensor configured to sense at least one sensed condition of the carbon recycling system.

B16. The carbon recycling system of the preceding section, wherein the at least one sensed condition includes a composition of the blast furnace gas emissions.

B17. The carbon recycling system of the preceding section, further comprising a control system configured to adjust operation of the electricity generation system based on the composition of the blast furnace gas emissions.

B18. The carbon recycling system of any preceding section, including a syngas generation system, wherein the syngas generation system includes at least the carbon monoxide generation system and optionally a separate dihydrogen source, and wherein the syngas generation system is configured to form syngas using the carbon monoxide and dihydrogen from the separate dihydrogen source.

B19. The carbon recycling system of the preceding section, including a gas line for injection of the syngas into the blast furnace.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A carbon recycling system for a blast furnace, the carbon recycling system forming a closed loop for carbon, the carbon recycling system comprising:

an electricity generation system positioned to receive an entirety of blast furnace gas emissions from the blast furnace, wherein the electricity generation system is configured to generate combustion exhaust and produce electricity;

a carbon dioxide concentration system positioned to receive the combustion exhaust and/or the blast furnace gas emissions, wherein the carbon dioxide concentration system is configured to output a carbon dioxide rich stream;

a carbon monoxide generation system positioned to receive the carbon dioxide rich stream, wherein the carbon monoxide generation system is configured to output carbon monoxide;

a syngas generation system comprising at least the carbon monoxide generation system, wherein the syngas generation system is configured to form syngas using the carbon monoxide; and a gas line for injection of the syngas into the blast furnace as a reducing agent, wherein an entirety of the syngas formed via the syngas generation system is injected into the blast furnace via the gas line, wherein the carbon recycling system is operable with a carbon recycling efficiency of at least 50%.

2. The carbon recycling system of claim 1, wherein the electricity generation system is electrically connected to the carbon monoxide generation system to power said carbon monoxide generation system.

3. The carbon recycling system of claim 1, wherein the electricity generation system is configured to combust carbon monoxide in the blast furnace gas emissions to generate the combustion exhaust.

4. The carbon recycling system of claim 1, wherein the carbon monoxide generation system comprises a co-electrolyzer positioned to receive a water input and the carbon dioxide rich stream, wherein the co-electrolyzer is configured to output the carbon monoxide, used to form the syngas.

5. The carbon recycling system of claim 1, wherein the carbon monoxide generation system is configured to generate the carbon monoxide using a reverse water gas shift (RWGS) system, the RWGS system positioned to receive a dihydrogen gas input and the carbon dioxide rich stream.

6. The carbon recycling system of claim 5, further comprising a water electrolysis system, the water electrolysis system configured to generate the dihydrogen gas input and a dioxygen gas input using a water input.

7. The carbon recycling system of claim 1, further comprising at least one sensor configured to sense at least one sensed condition of the carbon recycling system.

8. The carbon recycling system of claim 7, wherein the at least one sensed condition comprises a composition of the blast furnace gas emissions, and further comprising a control system configured to adjust operation of the electricity generation system based on the composition of the blast furnace gas emissions.

9. The carbon recycling system of claim 1, wherein the syngas generation system is configured to form the syngas using the carbon monoxide and dihydrogen obtained from the carbon monoxide generation system or a hydrogen source.

10. The carbon recycling system of claim 1, wherein:

the carbon dioxide concentration system is configured to output the carbon dioxide rich stream and a carbon dioxide lean stream, the carbon dioxide concentration system comprises a post-combustion carbon capture process selected from the group consisting of amine scrubbing, sorbent adsorption, membrane separation, electrochemically switch ion exchange, and combinations of two or more thereof, the carbon dioxide lean stream comprises less than 5% by volume of a carbon dioxide content of the combustion exhaust and the blast furnace gas emissions, the carbon monoxide generation system comprises a co-electrolyzer positioned to receive a water input and the carbon dioxide rich stream, the co-electrolyzer is configured to reduce carbon dioxide in the carbon dioxide rich stream to form the carbon monoxide and to oxidize water in the water input to form dihydrogen and dioxygen, the syngas generation system is configured to form the syngas using the carbon monoxide and the dihydrogen formed via the co-electrolyzer, the syngas formed via the syngas generation system comprises a carbon monoxide concentration of between 65% and 80% by volume and a hydrogen concentration between 20% and 35% by volume, and the carbon dioxide concentration system, the co-electrolyzer, and the syngas generation system are powered via the electricity generated by the electricity generation system.

11. A method of operating the carbon recycling system of claim 1, the method comprising:

generating, via the electricity generation system, electricity using the entirety of the blast furnace gas emissions from the blast furnace, the blast furnace gas emissions comprising carbon dioxide;

concentrating, via the carbon dioxide concentration system, the carbon dioxide from the blast furnace gas emissions, the carbon dioxide concentration resulting in the carbon dioxide rich stream;

generating, via the carbon monoxide generation system, the carbon monoxide from the carbon dioxide rich stream;

combining, via the syngas generation system, the carbon monoxide with hydrogen gas to form the syngas; and injecting, via the gas line, the entirety of the syngas formed via the syngas generation system into the blast furnace, wherein the carbon recycling system operates with the carbon recycling efficiency of at least 50%.

12. The method of claim 11, wherein generating the electricity comprises generating the electricity before concentrating the carbon dioxide.

13. The method of claim 11, wherein generating carbon monoxide uses a co-electrolysis process using the carbon dioxide rich stream and a water stream to form the carbon monoxide and dioxygen gas.

14. The method of claim 13, wherein the co-electrolysis process further forms the hydrogen gas.

15. The method of claim 11, wherein generating carbon monoxide uses a reverse water gas shift process using the carbon dioxide rich stream and a dihydrogen stream to form the carbon monoxide and water.

16. The method of claim 15, further comprising generating the dihydrogen stream using an electrolysis process forming the dihydrogen stream and a dioxygen stream from a water stream.

17. The method of claim 11, wherein generating the carbon monoxide comprises generating the carbon monoxide using the electricity generated by the blast furnace gas emissions.

18. The method of claim 11, wherein concentrating the carbon dioxide comprises concentrating the carbon dioxide using the electricity generated by the blast furnace gas emissions.

19. The method of claim 11, further comprising sensing at least one condition of one or more of the blast furnace gas emissions, the electricity, the carbon monoxide, or the syngas.

20. The method of claim 19, further comprising adjusting at least one operating parameter based on the at least one condition.

* * * * *